Aug. 6, 1946.  A. VOTH  2,405,534
BALE LOADING AND UNLOADING WAGON
Filed March 6, 1945
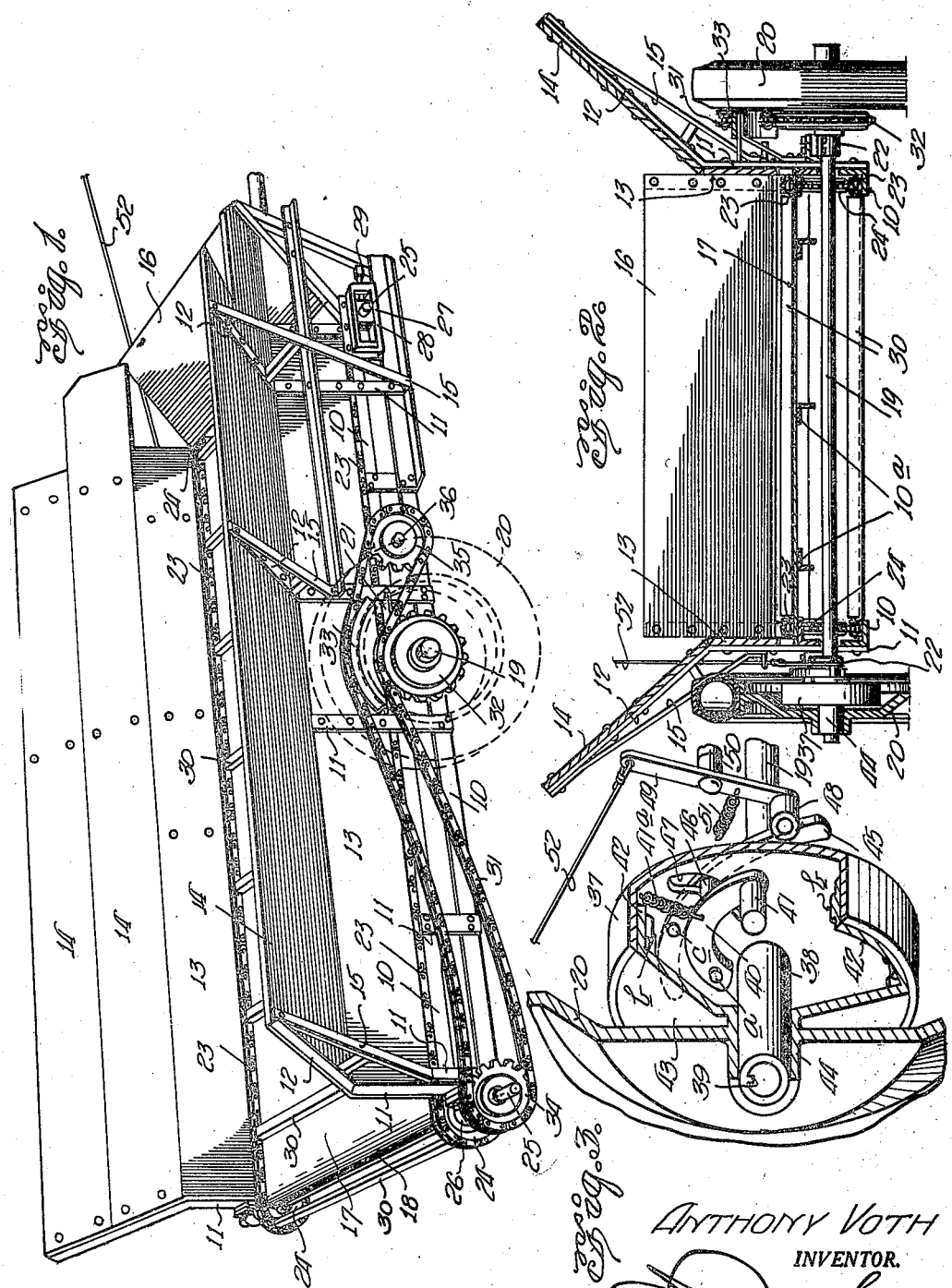
ANTHONY VOTH
INVENTOR.
ATTORNEY Patented Aug. 6, 1946

2,405,534

UNITED STATES PATENT OFFICE 2,405,534

BALE LOADING AND UNLOADING WAGON

Anthony Voth, Gainesville, Tex.

Application March 6, 1945, Serial No. 581,237

1 Claim. (Cl. 214—83)

This invention relates to agricultural machinery and more particularly to bale unloading vehicles for hay balers.

In cutting and baling hay, it has been the practice to either deposit the bales of hay onto the field after tying or load the bales onto a rack wagon for transportation to a storage place. When the bales are indiscriminately dumped onto the ground, additional labor is required to load and haul the bales to storage.

It is the principal object of the invention to reduce labor and cost of handling baled hay from the baler to storage by providing a novel form of trailer, adapted to be hitched behind the baler, onto which the hay bales are deposited from the baler and which trailer is equipped with a conveyor, operated at desired intervals in a direction opposite that in which the trailer is traveling, to dump the load of several bales on a windrow for convenient reloading and transportation.

With the foregoing and other objects in view, the invention has particular reference to certain features of accomplishment which will become apparent as the description proceeds, taken in connection with the accompanying drawing wherein:

Figure 1 is a perspective view of a trailer constructed according to the present invention.

Figure 2 is an end view in vertical section, and

Figure 3 is a perspective view of a type of trip lever control, partly broken away.

Continuing with a more detailed description of the drawing, reference is primarily made to Figure 1 wherein is shown a frame consisting of four, relatively parallel angle irons 10, two on each side, one above the other, as shown. The side angles are held in spaced apart relationship by means of straps 11 which are, in some cases, also made of angle irons. Some of these straps extend upwardly to provide supports 12 for vertical side boards 13 and angular top boards 14. Angular braces 15 aid in reinforcing the top boards 14.

It will be observed in Figure 1 that the lower of the two upper boards 14 extends a short distance beyond the upper board, serving to deflect bales of hay deposited onto an angular end board 16 at the front of the trailer as they are tied and discharged from a baler, not shown.

A floor 17 is supported by the uppermost angles 10 and intermediate angles 10a and at the rear of the trailer, this floor is curved downwardly at 18, as shown in Figure 1, to facilitate discharge of bales from the trailer.

The trailer or unloader is supported by means of a transverse axle 19, carrying wheels 20. An angle iron 21 is bolted to the frame on each side and to the underside of the outwardly extending flanges of these irons are bolted bearings 22 in which the shaft or axle 19, which extends across between the angles 10, is journaled.

The side angles 10 afford a support for endless conveyor chains 23, although the upper leads of these chains actually slide on the floor 17 adjacent the side edges thereof. These chains are driven by sprockets 24, mounted on transverse shafts 25 (Fig. 1), at each end of the frame.

The rearmost shaft 25 is journaled in bearings 26, bolted to the vertical lower portions of the rear angles or straps 11 while the front shaft 25 has its ends journaled in sliding blocks 27, only one being shown in Figure 1. These blocks are mounted in rectangular frames 28 and are adjustable by means of screws 29 to maintain the required amount of tension on the conveyor chains 23. This tightening arrangement is conventional.

Extending between the chains 23 is a series of relatively spaced bars or cleats 30, the full length of the conveyor, for moving bales rearwardly of the trailer when the conveyor is actuated.

The conveyor is operated by means of a chain 31 on one side of the frame. This chain is in turn operated by a large sprocket 32 which is keyed on the axle 19, over which the lower lead of chain 31 passes. The upper lead of the chain 31, where it extends above the axle 19, is slidably supported on an arcuate member 33, bolted to and extending outwardly from the trailer frame. The chain 31 embraces a sprocket 34, mounted on the rear shaft 25 and an idler sprocket 35, mounted on a stub shaft 36, extending outwardly from a mounting plate, not shown, bolted to the machine frame.

It will be understood that both wheels 20 are freely mounted on the axle 19. Consequently, the conveyor and its operating chain 31 are idle as the trailer is drawn along by and behind the baler between unloading periods, which latter are at windrows selected by the operator. The description of actual dumping or unloading operations will follow presently.

Shown in Figure 3 is a more or less conventional type of trip lever employed for setting the conveyor in operation for unloading. This device consists of a circular housing 37, having an integral sleeve 38 extending outwardly therefrom which is secured by means of a key 39 to the end of the axle 19. Within the drum or housing 37, there is provided an arcuate arm 40, pivoted at $a$ at one end. The opposite end of the arm carries a roller 41 which is urged by means of spring 41a, towards the toothed inner periphery $b$ of a flange 42, carried by a member 43 which is formed on a hub 44 of a wheel 20. It is the purpose of the arrangement to secure the drum 37 in common rotation with the member 43 and the wheel 20, which action will obviously impart rotation to the shaft 19, to cause the sprocket 32 to rotate. As earlier set forth, rotation of sprocket 32 will cause chain 31 to travel in a counter-clockwise direction, to similarly rotate shaft 25. Obviously then, shaft 25 will impart counter-clockwise rotation to conveyor chains 23, which, through the medium of cleats 30, move bales off the floor 17 onto the ground.

To control the action of the trip lever arrangement described, a curved arm 45 is pivoted at $c$ to the outer face of drum 37 and is connected with arm 40 by means of a pin 46, extending through a slot 47, curved in an arc corresponding to the travel of the arms 40 and 41. Between dumping periods, the arm 40 is held out of engagement with the toothed inner periphery $b$ of member 43, against the resistance of spring 41a by a roller 48, carried by an arm 49, pivoted at 50 to the frame of the vehicle. A spring 51 holds the arm 50 in such position that the roller 48 will lie against the extended end of the curved arm 45 and hold the same until it is desired to set the conveyor into operation.

When the trailer is loaded to capacity, a pull is exerted on a line 52, which extends forwardly to the operator's position on the baler, whereupon the arm 49 is moved against the resistance of spring 51, to displace the roller 48 with respect to the arm 45. When this is done, the spring 41a causes the arm 40 to move to bring the roller 41 into engagement with the toothed periphery $b$ of the member 43, locking the drum 37 and member 43 in common rotation with the wheel 20. Therefore, since the drum 37 is secured to the axle 19, the latter turns to rotate the sprocket 52, resulting in rotation of the chains 31 and 23 in the manner explained.

When unloading is accomplished, the line 52 is released to return the arm 49 and its roller 48 to original position in the path of arm 45. When the arm 45 moves against roller 48, it is depressed, to similarly actuate arm 40 against the resistance of spring 41a, to move it out of engagement with the toothed periphery $b$ of member 43 and the latter and of course the wheel 20 is ineffective to further rotate the axle 19 and sprocket 32.

Manifestly, the construction as shown and described is capable of some modification and such modification as may be construed to fall within the scope and meaning of the appended claim is also considered to be within the spirit and intent of the invention.

What is claimed is:

In an unloading trailer for baled hay, the combination comprising a frame consisting of spaced apart pairs of angle irons supporting a floor, an axle on said frame having wheels freely mounted thereon, a transverse shaft at each end of said frame, one of which is axially adjustable with respect to the other, sprockets on each end of each of said shafts, endless chains operating over said sprockets and guided by said angle irons, cleats extending between said chains and slidable over said floor longitudinally thereof, auxiliary sprockets carried by the rearmost of said transverse shafts and said axle, the latter being fixed to said axle, an idler sprocket forwardly of said axle, a chain operating over said first auxiliary sprocket and said idler sprocket whose lower lead is in engagement with said axle sprocket, means for locking one of said wheels with said axle to rotate said axle sprocket to operate said endless chains through said latter chain in a direction counter to the normal direction of travel of said trailer, a lever pivotally attached to said trailer adjacent said locking means for actuating the same and means secured to said lever and extending forwardly and beyond said trailer for operating said lever.

ANTHONY VOTH.